(12) United States Patent
Inoue et al.

(10) Patent No.: US 11,703,867 B2
(45) Date of Patent: Jul. 18, 2023

(54) VEHICLE

(71) Applicant: TOYOTA JIDOSHA KABUSHIKI KAISHA, Toyota (JP)

(72) Inventors: Shunji Inoue, Okazaki (JP); Kunihiro Iwamoto, Nagakute (JP); Daisuke Sato, Toyota (JP); Takuya Watabe, Chofu (JP); Makoto Kakuchi, Toyota (JP); Seiichi Tsunoda, Nissin (JP); Keima Fukunaga, Tokyo (JP); Kenta Miyahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 17/015,221

(22) Filed: Sep. 9, 2020

(65) Prior Publication Data
US 2021/0109530 A1 Apr. 15, 2021

(30) Foreign Application Priority Data
Oct. 11, 2019 (JP) .................................. 2019-187658

(51) Int. Cl.
*G05D 1/02* (2020.01)
*B60S 3/04* (2006.01)
*G06V 20/56* (2022.01)

(52) U.S. Cl.
CPC ............ *G05D 1/0212* (2013.01); *B60S 3/042* (2013.01); *G06V 20/56* (2022.01)

(58) Field of Classification Search
CPC ........ B60S 3/042; G06V 20/56; G05D 1/0212
USPC .......................................................... 701/28
See application file for complete search history.

(56) References Cited

U.S. PATENT DOCUMENTS

| | | | |
|---|---|---|---|
| 11,199,853 B1 * | 12/2021 | Afrouzi ................ | G05D 1/0246 |
| 2004/0016070 A1 * | 1/2004 | Nemcek ................ | A63B 55/60 |
| | | | 15/53.4 |
| 2016/0339879 A1 * | 11/2016 | Hirata ..................... | B60S 3/042 |
| 2018/0165782 A1 * | 6/2018 | Ibe ......................... | B65G 61/00 |
| 2022/0205202 A1 * | 6/2022 | Frea ......................... | E01H 8/10 |

FOREIGN PATENT DOCUMENTS

| | | |
|---|---|---|
| DE | 3708606 A1 | 9/1988 |
| JP | 2008-213568 A | 9/2008 |
| JP | 2016-218733 A | 12/2016 |
| JP | 6455985 B2 | 1/2019 |
| KR | 10-2016-0097812 A | 8/2016 |

* cited by examiner

*Primary Examiner* — Yazan A Soofi
(74) *Attorney, Agent, or Firm* — Sughrue Mion, PLLC

(57) ABSTRACT

A vehicle traveling from a first area to a second area includes a traveling mechanism having a plurality of wheels and a traveling function, and a control unit configured to cause the traveling mechanism to perform a wheel cleaning operation and then cause the vehicle to enter the second area.

6 Claims, 10 Drawing Sheets

VEHICLE

CROSS-REFERENCE TO RELATED APPLICATION

This application claims priority to Japanese Patent Application No. 2019-187658 filed on Oct. 11, 2019, incorporated herein by reference in its entirety.

BACKGROUND

1. Technical Field

The present disclosure relates to a vehicle having an autonomous traveling function.

2. Description of Related Art

Japanese Patent No. 6455985 (JP 6455985 B) discloses a delivery system in which a delivery vehicle delivers packages to a delivery destination. The delivery vehicle loads delivery boxes to be delivered to the delivery destination. When the delivery vehicle moves to the delivery destination, the delivery boxes are fixed, by a movable member of the delivery vehicle, to a delivery box fixture provided at the delivery destination.

SUMMARY

However, the delivery system disclosed in JP 6455985 B does not consider a case where the delivery vehicle enters a building to reach the delivery destination. The present inventors have recognized that convenience is enhanced when the delivery vehicle enters a building that is the delivery destination and delivering packages to a location designated by a user within the building. However, if the delivery vehicle enters the building from outside, the inside of the building may be contaminated by dirt on the wheels of the delivery vehicle.

An objective of the present disclosure is to provide a vehicle which travels from a first area to a second area, and is less likely to contaminate the second area.

The present disclosure is intended to address such an issue. A vehicle according to an aspect of the present disclosure is a vehicle traveling from a first area to a second area. The vehicle includes a traveling mechanism having a plurality of wheels and a traveling function, and a control unit configured to cause the traveling mechanism to perform a wheel cleaning operation and then cause the vehicle to enter the second area.

With the present disclosure, it is possible to provide a vehicle which travels from a first area to a second area and is less likely to contaminate the second area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1A:
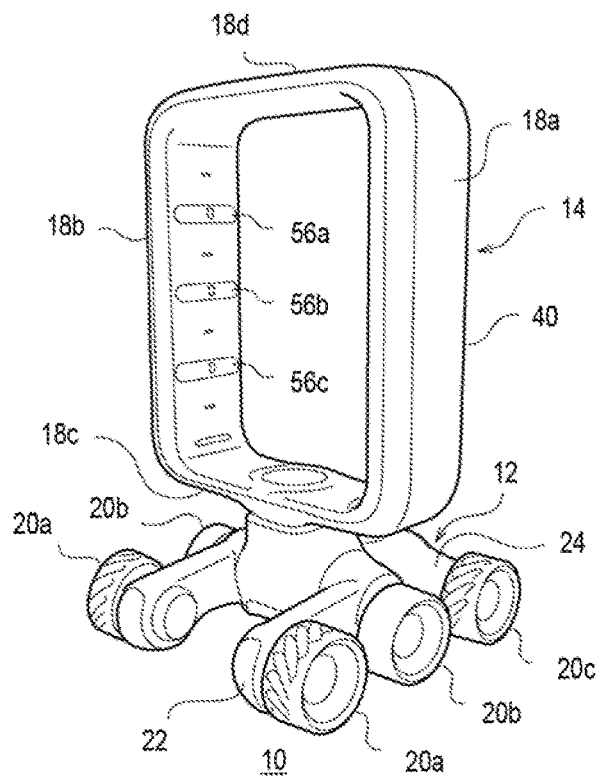
FIG. 1A is a perspective view of a package transport robot according to a first embodiment.
Figure 1B:
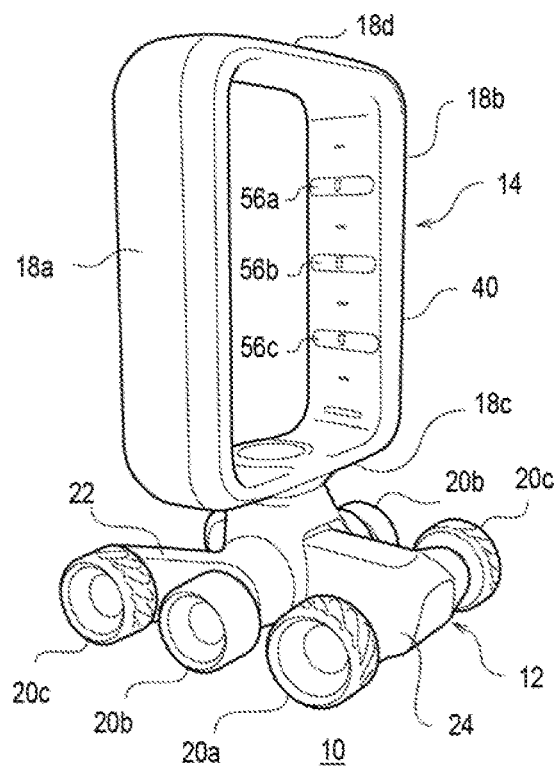
FIG. 1B is a perspective view of a package transport robot according to the first embodiment.

FIGS. 1A and 1B are respectively perspective views of a package transport robot 10 according to a first embodiment. A package transport robot 10 can also be referred to as a vehicle. A height of the package transport robot 10 may be, for example, about 1 to 1.5 meters. The package transport robot 10 includes a traveling mechanism 12 having an autonomous traveling function, and a main body unit 14 supported by the traveling mechanism 12 for placing an object such as a package thereon. The traveling mechanism 12 includes a first wheel body 22 and a second wheel body 24. The first wheel body 22 has a pair of front wheels 20a and a pair of middle wheels 20b, and the second wheel body 24 has a pair of rear wheels 20c. FIGS. 1A and 1B show a state where the front wheel 20a, the middle wheel 20b, and the rear wheel 20c are arranged in a straight line.

The main body unit 14 has a frame body 40 formed in a rectangular shape, and a storage space for placing the object such as the package thereon is formed inside the frame body 40. The frame body 40 includes a pair of right and left side walls 18a and 18b, a bottom plate 18c connecting the pair of side walls at a lower side, and a top plate 18d connecting the pair of side walls at an upper side. A pair of opposed ridges (ribs) 56a, 56b, 56c (hereinafter referred to as "ridges 56" unless otherwise specified) are provided on inner surfaces of the right side wall 18a and the left side wall 18b. The main body unit 14 is connected to the traveling mechanism 12 so as to be relatively movable. The package transport robot 10 has a home delivery function of loading a package, autonomously traveling to a predetermined destination, and delivering the package to a user waiting at the destination. Hereinafter, regarding the orientation of the main body unit 14, a direction perpendicular to an opening of the frame body 40 in a state where the main body unit 14 stands upright with respect to the traveling mechanism 12 is referred to as a "longitudinal direction", and a direction perpendicular to the pair of side walls is referred to as a "horizontal direction."

Figure 2A:
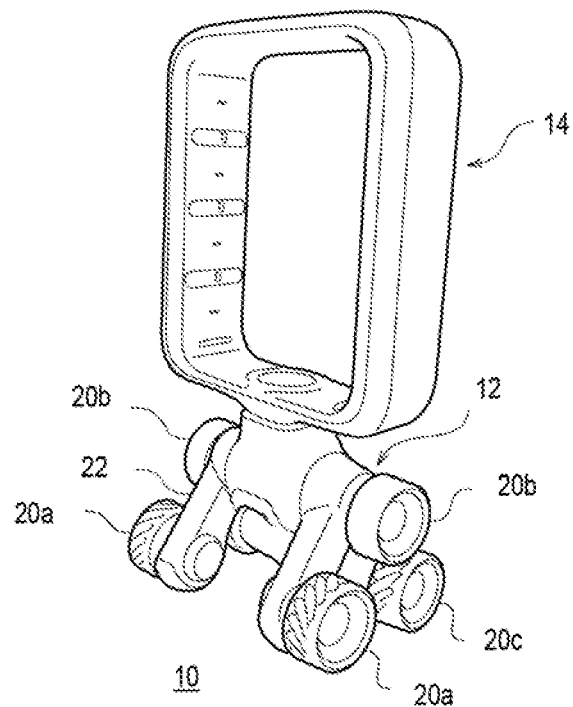
FIG. 2A is a perspective view of the package transport robot in an upright posture.
Figure 2B:
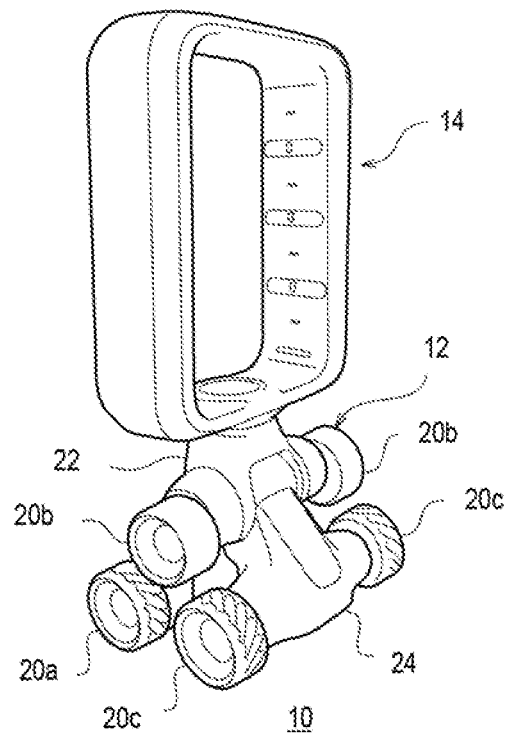
FIG. 2B is a perspective view of the package transport robot in an upright posture.

FIGS. 2A and 2B are respectively perspective views of the package transport robot 10 in an upright posture. The front wheel 20a and the rear wheel 20c in the traveling mechanism 12 approach each other, and the first wheel body 22 and the second wheel body 24 incline with respect to a contact surface, whereby the package transport robot 10 transitions an upright posture. For example, the package transport robot 10 reaches the destination and transitions an upright posture in front of the user at the destination, so that the user can easily pick up the package addressed to the user, which is positioned on the main body unit 14.

Figure 3:
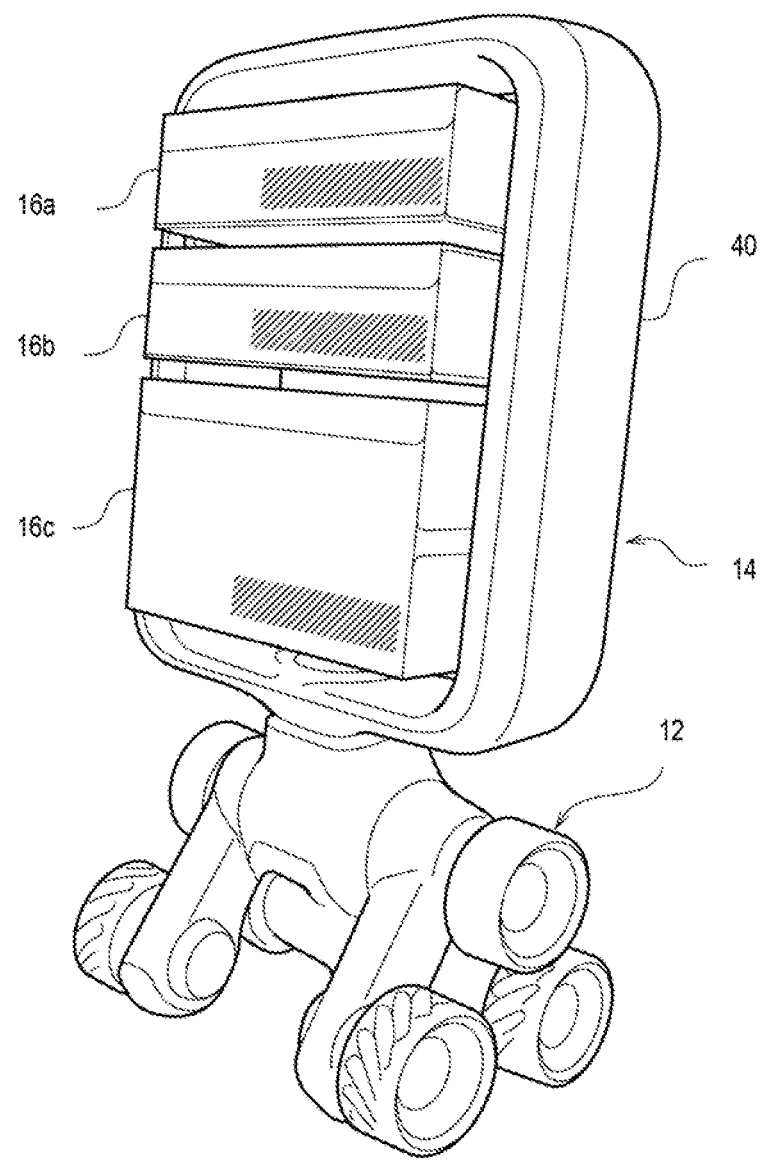
FIG. 3 is a perspective view of the package transport robot in an upright posture with a package loaded.

FIG. 3 is a perspective view of the package transport robot 10 in an upright posture with packages loaded. FIG. 3 shows a state where a first package 16a, a second package 16b, and a third package 16c are stacked on the main body unit 14. The first package 16a, the second package 16b, and the third package 16c are placed on or engaged with the ridges 56 formed on the inner surfaces of the right side wall 18a and the left side wall 18b, thereby being placed on the main body unit 14.

Although the first package 16a, the second package 16b, and the third package 16c, shown in FIG. 3, respectively have box shapes, the object placed on the main body unit 14 is not limited to a box shape. For example, a container for storing the object may be placed on the pair of ridges 56, and the object may be put in the container. Further, a hook may be provided on the inner surface of the top plate 18d of the frame body 40, the object may be put in a bag with a handle, and the handle of the bag may be hung on the hook, thereby hanging the bag.

Figure 4A:
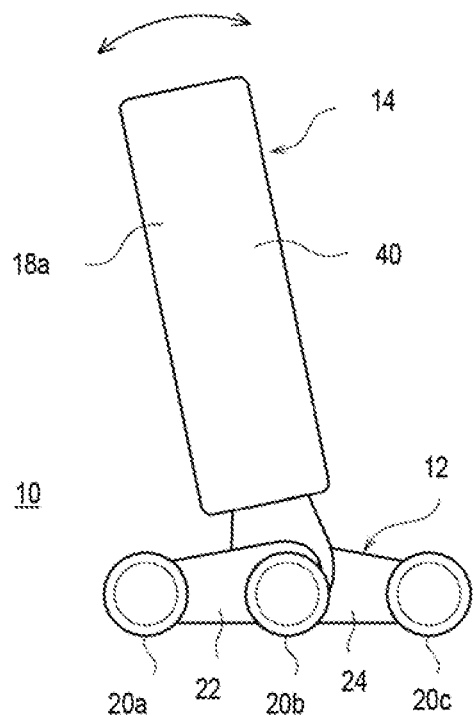
FIG. 4A is a diagram illustrating a relative movement of a main body unit with respect to a traveling mechanism.
Figure 4B:
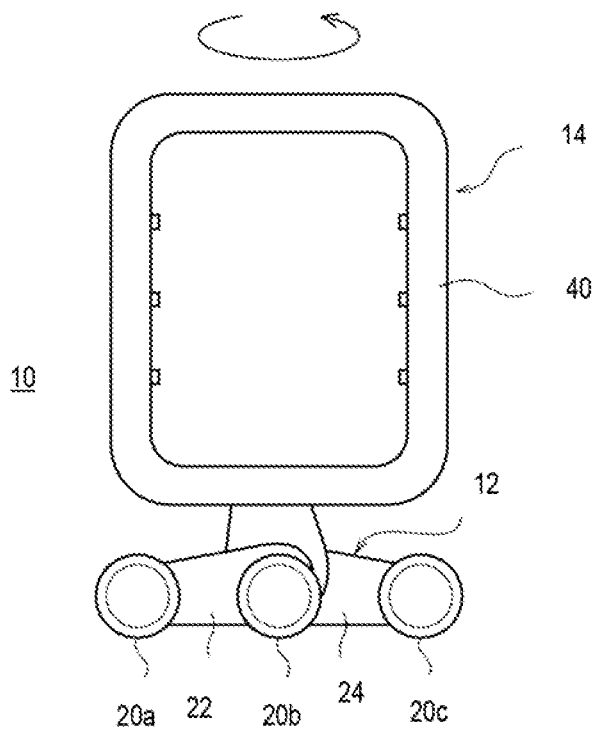
FIG. 4B is a diagram illustrating a relative movement of the main body unit with respect to the traveling mechanism.

FIGS. 4A and 4B are respective diagrams illustrating a relative movement of the main body unit 14 with respect to the traveling mechanism 12. FIG. 4A shows a state where the side wall of the frame body 40 is inclined with respect to a vertical direction. The frame body 40 is rotatably supported by a connecting shaft extending in the horizontal direction with respect to the traveling mechanism 12, and can be tilted in any way in the longitudinal direction.

FIG. 4B shows a state in which the frame body 40 has been rotated about 90 degrees about a vertical axis. The frame body 40 is supported by a connecting shaft extending in the vertical direction with respect to the traveling mechanism 12, and the frame body 40 and the traveling mechanism 12 are relatively rotated about the connecting shaft, whereby the frame body 40 is rotated as shown in FIG. 4B. The frame body 40 may be rotatable by 360 degrees.

Figure 5A:
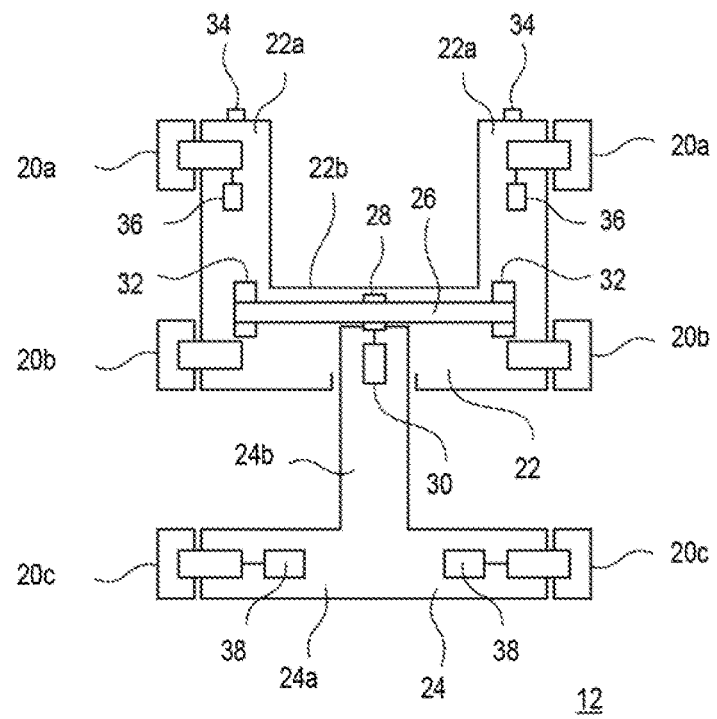
FIG. 5A is a diagram illustrating a structure of the package transport robot.
Figure 5B:
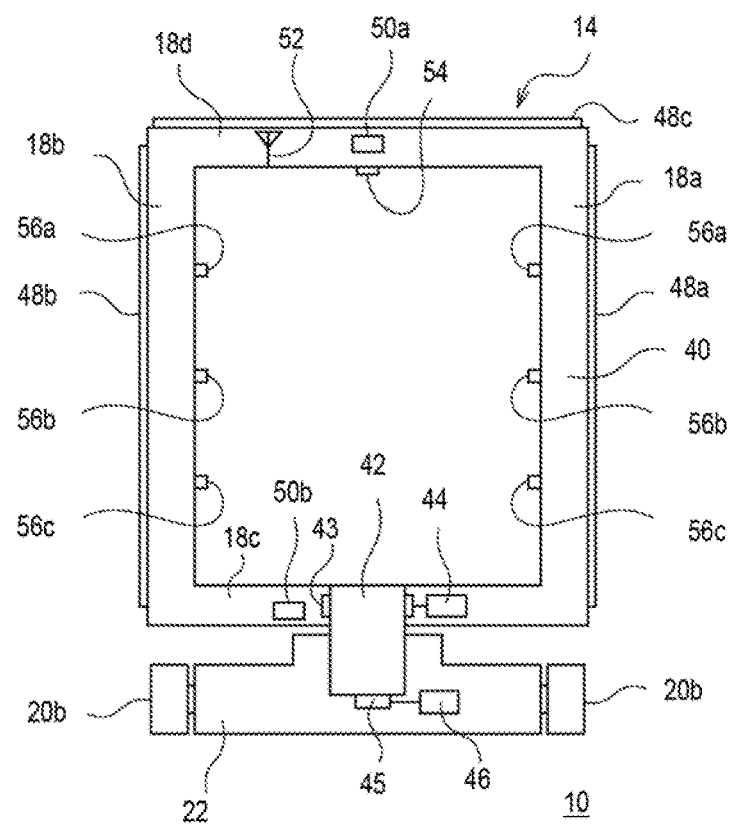
FIG. 5B is a diagram illustrating the structure of the package transport robot.

FIGS. 5A and 5B are respectively diagrams illustrating a structure of the package transport robot 10. FIG. 5A shows the structure of the traveling mechanism 12, and FIG. 5B mainly shows the structure of the main body unit 14. A power supply unit and a control unit are provided in the traveling mechanism 12 and the main body unit 14, but are omitted in FIGS. 5A and 5B.

As shown in FIG. 5A, the traveling mechanism 12 includes the front wheels 20a, the middle wheels 20b, the rear wheels 20c, the first wheel body 22, the second wheel body 24, a shaft body 26, a connection gear 28, an upright actuator 30, a shaft body support unit 32, an object detection sensor 34, a front wheel motor 36 and a rear wheel motor 38.

The first wheel body 22 has a pair of side members 22a, and a cross member 22b connecting the pair of side members 22a and extending in a vehicle width direction. The pair of side members 22a are provided to extend in a direction perpendicularly to both ends of the cross member 22b. The pair of front wheels 20a are provided at locations of front ends of the pair of side members 22a, and the pair of middle wheels 20b are provided at locations of both side ends of the cross member 22b. The front wheel motor 36 for rotating a wheel shaft is provided on each of the pair of front wheels 20a.

The second wheel body 24 has a cross member 24a extending in the vehicle width direction, and a connection member 24b extending in a direction perpendicularly to a center position of the cross member 24a. The connection member 24b is inserted into the cross member 22b of the first wheel body 22, and is connected to the first wheel body 22 so as to be relatively rotatable. The rear wheels 20c are provided at both side ends of the cross member 24a.

The rear wheel motor 38 for rotating a wheel shaft is provided on each of the pair of rear wheels 20c. The pair of front wheels 20a and the pair of rear wheels 20c can be independently rotated by the respective motors, and the traveling mechanism 12 can turn left and right by a difference in the rotation amounts between the left and right wheels.

The shaft body 26 extending in the vehicle width direction and the shaft body support unit 32 for supporting both ends of the shaft body 26 are provided within the cross member 22b. The connection member 24b of the second wheel body 24 is rotatably connected to the shaft body 26 by the connection gear 28. The upright actuator 30 can rotate the connection member 24b about the axis of the shaft body 26. The first wheel body 22 and the second wheel body 24 are relatively rotated by driving the upright actuator 30, can transition an upright posture shown in FIGS. 2A and 2B, and can return from an upright posture to a horizontal posture shown in FIGS. 1A and 1B.

The traveling mechanism 12 has a rocker-bogie structure capable of traveling on, for example, steps on a road. The shaft body 26 that connects the first wheel body 22 and the second wheel body 24 is deviated from a wheel shaft of the middle wheel 20b, and is positioned between a wheel shaft of the front wheel 20a and a wheel shaft of the middle wheel 20b in a direction perpendicular to a vehicle width. Consequently, the first wheel body 22 and the second wheel body 24 rotate about the shaft body 26 which serves as a fulcrum and the first wheel body 22 and the second wheel body 24 can bend according to a road profile of a road on which the wheels are running.

The object detection sensor 34 is mounted on the first wheel body 22 and detects objects in the traveling direction. The object detection sensor 34 may be a millimeter wave radar, an infrared laser, a sound wave sensor or the like, or alternatively, may be a combination thereof. The object detection sensor 34 may be mounted not only on the front part of the first wheel body 22 but also at various locations on the first wheel body 22 and the second wheel body 24 in order to detect objects in a rearward or lateral direction.

As shown in FIG. 5B, the package transport robot 10 includes the frame body 40, the connecting shaft 42, an outer peripheral tooth 43, a rotation actuator 44, a connecting shaft 45, a tilt actuator 46, a first camera 50a, a second camera 50b, and a communication unit 52. The frame body 40 includes displays 48a, 48b, and 48c (hereinafter referred to as "displays 48" unless otherwise specified), a hook 54, a pair of first ridges 56a, a pair of second ridges 56b, and a pair of third ridges 56c. For better understanding, in FIG. 5B, the connecting shaft 42, the outer peripheral tooth 43, the rotation actuator 44, the connecting shaft 45, and the tilt actuator 46 are simplified and integrally shown in FIG. 5B. However, the connecting shaft 42, the outer peripheral tooth 43 and the rotation actuator 44 may be provided separately from the connecting shaft 45 and the tilt actuator 46.

The ridges 56 are provided so as to protrude from the inner surfaces of the right side wall 18a and the left side wall 18b such that the package, for example, can be placed. The hook 54 for hanging the package is formed on the inner surface of the top plate 18d of the frame body 40. The hook 54 may always be exposed from the inner surface of the top plate of the frame body 40, but may be provided so as to be accommodated in the inner surface of the top plate so that the hook 54 can be taken out when needed.

The displays 48a and 48b are provided on outer surfaces of the right side wall 18a and the left side wall 18b, respectively, and the display 48c is provided on an outer surface of the top plate 18d to display images. The bottom plate 18c and the top plate 18d are provided with the first camera 50a and the second camera 50b (hereinafter referred to as "cameras 50" unless otherwise specified). It is preferable that the package transport robot 10 be equipped with a camera in addition to the first camera 50a and the second camera 50b to monitor all surrounding situations. The camera 50 may be provided at a location where an image of the storage space of the frame body 40 can be captured. The communication unit 52 is further provided on the top plate 18d, and the communication unit 52 can communicate with an external server device via a wireless communication network.

The bottom plate 18c is rotatably attached to the outer peripheral tooth 43 of the connecting shaft 42 via a gear (not shown) on a side of the rotation actuator 44, and is connected to the first wheel body 22 by the connecting shaft 42. The rotation actuator 44 rotates the frame body 40 about the axis with respect to the connecting shaft 42 by relatively rotating the outer peripheral tooth 43 and the gear. The rotation actuator 44 allows the frame body 40 to be rotated as shown in FIG. 4B.

The tilt actuator 46 rotates the connecting shaft 45 so as to tilt the connecting shaft 42 with respect to the vertical direction. The connecting shaft 45 extending in the horizontal direction is provided integrally with a lower end of the connecting shaft 42, and the tilt actuator 46 rotates the connecting shaft 45 to achieve a tilting motion of the connecting shaft 42. By tilting the connecting shaft 42, the tilt actuator 46 can tilt the frame body 40 in the longitudinal direction as shown in FIG. 4A.

Figure 6:
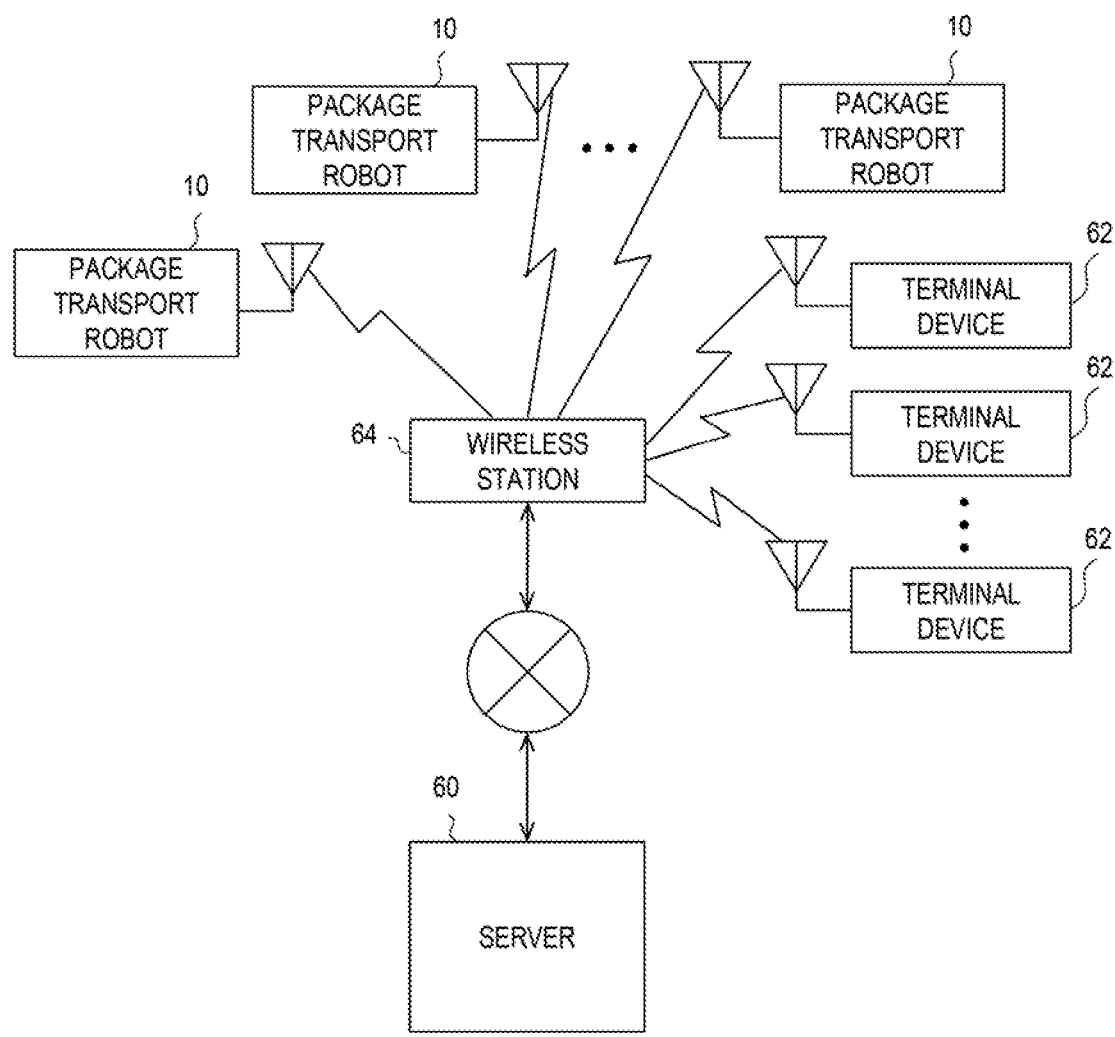
FIG. 6 is a diagram illustrating a configuration outline of a package transport system according to the first embodiment.

FIG. 6 is a diagram illustrating a configuration outline of a package transport system 1 according to the first embodiment. The package transport system 1 provides a pickup/delivery (P/D) service of, for example, packages. The package transport system 1 includes a plurality of package transport robots 10, a server device 60, a plurality of terminal devices 62, and a wireless station 64. The server device 60 and the wireless station 64 are connected via a network such as the Internet. The communication unit 52 of the package transport robot 10 connects to the server device 60 via the wireless station 64 which is a base station. The server device 60 functions as a management device that manages the plurality of package transport robots 10, and is installed in a data center.

The terminal device 62 is a smartphone or a personal computer operated by the user, and is connected to the server device 60 via the wireless station 64. The terminal device 62 may communicate directly with the package transport robot 10.

For example, the packages are loaded on the package transport robot 10 in a distribution center. The plurality of package transport robots 10, each loaded with the packages, are mounted on a large delivery vehicle. The large delivery vehicle travels to a relay point. At the relay point, the package transport robot 10 gets off the large delivery vehicle. The packages may be loaded on the package transport robot 10 automatically by other robots, or manually by staff. A plurality of packages each having a different delivery destination may be loaded on the package transport robot 10. The package transport robot 10 can pick up packages. The packages may be loaded on the package transport robot 10 at a facility of the relay point without using the large delivery vehicle.

The frame body 40 is provided with a mechanism for locking (fixing) the loaded package to the frame body 40. While the package transport robot 10 is traveling, the package is fixed to the frame body 40 by a locking mechanism, so that the package does not fall out during traveling and is not removed by a third party who is not a recipient.

The package transport robot 10 that gets off at the relay point autonomously travels on the road to a P/D destination of the package. Further, the package transport robot 10 enters a building at the P/D destination, and autonomously travels inside the building to a P/D location designated by the user within the building. The building is assumed to be, for example, a house or a company building designed to be barrier-free, and the package transport robot 10 can easily enter and travel inside the building. In a case where the P/D destination is a house, the user does not have to receive or leave a package at the entrance and can receive or leave a package at a location within the house designated by him/her, thereby enhancing convenience, especially for an old or disabled user. In a case where the P/D destination is a company, it is not necessary to have a specific employee who receives and re-delivers the package to the user in the company, and the user does not have to carry the package to a pick-up location in the company when shipping.

Since the package transport robot 10 travels on a road to the P/D destination, the wheels 20 may get dirty. In particular, the wheels 20 become dirtier when traveling on a road with mud after raining or snowing, or on a road with animal feces or trash. When the robot travels in a building with the dirty wheels 20, the dirt on the wheels 20 spreads into the building, and the building may also become dirty. Therefore, as described later, the package transport robot 10 performs a cleaning operation of the wheels 20 before entering the building.

The user of the P/D service inputs, to the terminal device 62 in advance, information on the P/D destination of the package and information for designating the second area with a floor or a road surface that the user wants to prevent from being contaminated. The information on the P/D destination includes address and information on the P/D location within the building. The P/D location in the building is specified by latitude and longitude. The second area may be set, for example, as the entire building at the P/D destination, or may be set as the entire site including the building. In a case where the P/D destination is an apartment, the second area may be set to fall within the range of a home. The second area is specified by latitude and longitude. Since the user can determine the area that the user wants to prevent from being contaminated, it is possible to flexibly respond to the situation of the user.

The terminal device 62 transmits the inputted information to the server device 60. Information for identifying the user is attached to the transmitted information. The server device 60 holds, for each user, information on the P/D destination of the package and information for specifying the second area, and transmits the information to the package transport robot 10 that is responsible for providing P/D service of the package for the user.

Figure 7:
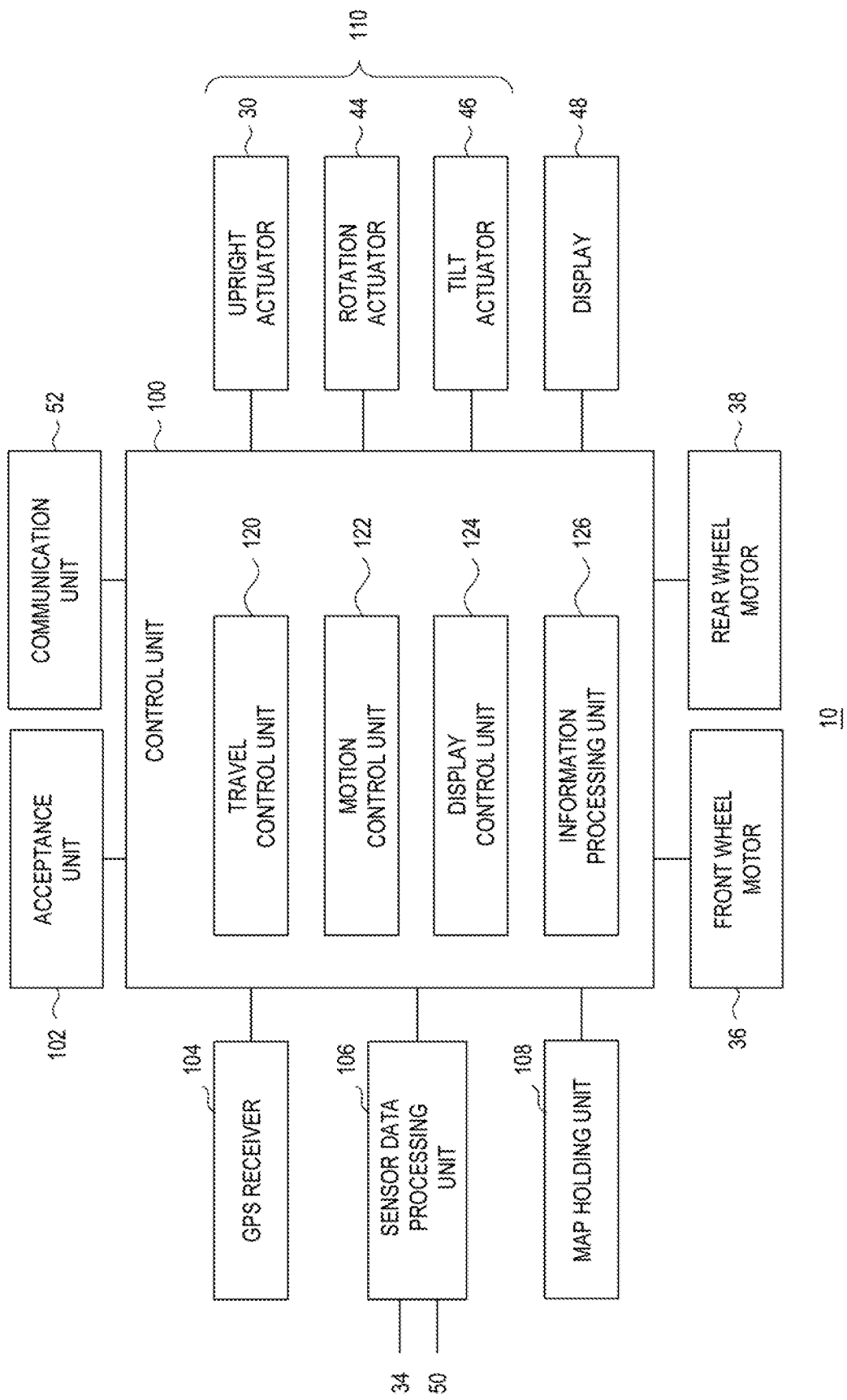
FIG. 7 is a diagram illustrating functional blocks of the package transport robot shown in FIGS. 1A and 1B.

FIG. 7 is a diagram illustrating functional blocks of the package transport robot 10 shown in FIGS. 1A and 1B. The package transport robot 10 includes a control unit 100, an acceptance unit 102, a communication unit 52, a GPS (Global Positioning System) receiver 104, a sensor data processing unit 106, a map holding unit 108, an actuator mechanism 110, the display 48, the front wheel motor 36, and the rear wheel motor 38. The control unit 100 includes a travel control unit 120, a motion control unit 122, a display control unit 124, and an information processing unit 126. The actuator mechanism 110 includes the upright actuator 30, the rotation actuator 44, and the tilt actuator 46. The communication unit 52 has a wireless communication function, can communicate with another communication unit of the package transport robot 10 as vehicle-to-vehicle communication, and can receive information transmitted from a portable terminal device such as a user's smartphone. The GPS receiver 104 detects a current location based on a signal from a satellite.

In FIG. 7, each component stated as a functional block for performing various processes can be configured by a circuit block, a memory, and other LSIs in terms of hardware, or alternatively, configured by a program loaded into the memory in terms of software. Therefore, it will be apparent to those skilled in the art that the functional blocks can be implemented in various forms by hardware only, software only, or a combination thereof, but not limited to any one of them.

Hereinafter, package delivery will be described, but package pick-up can be similarly carried out. The communication unit 52 acquires the information on the P/D destination of the package and the second area from the server device 60, and supplies the acquired information to the travel control unit 120.

The map holding unit 108 holds map information indicating a road location and a passage location in the building which is the P/D destination.

The travel control unit 120 determines a travel route as a traveling target of the package transport robot 10 based on the map information held in the map holding unit 108, current location information supplied from the GPS receiver 104, and the information on the P/D destination of the package. The travel route may be obtained from the server device 60.

The travel control unit 120 controls the traveling mechanism 12 to travel on the set travel route using the map information held in the map holding unit 108 and the current location information supplied from the GPS receiver 104. In particular, the travel control unit 120 drives the front wheel motor 36 and the rear wheel motor 38 so as to cause the package transport robot 10 to travel to the P/D location.

The sensor data processing unit 106 acquires information about objects existing around the package transport robot 10 based on the detected data by the object detection sensor 34 and the image captured by the camera 50, and provides the information to the travel control unit 120. The target object includes static objects such as a structure or a gutter that hinders traveling, and movable objects such as a person or another package transport robot 10. The travel control unit 120 determines a traveling direction and a traveling speed so as to avoid collision with other objects, and controls driving of the front wheel motor 36 and the rear wheel motor 38. The display control unit 124 controls the display on the display 48.

The travel control unit 120 performs a cleaning operation of the wheels 20 on the traveling mechanism 12 before allowing the package transport robot 10 to enter the second area. An example of the cleaning operation of the wheels 20 is an operation in which the traveling mechanism 12 travels on a dirt removing mat, and may be referred to as a washing operation of the wheels 20. The dirt removing mat can remove at least a portion of the dirt on the wheel 20.

Figure 8:
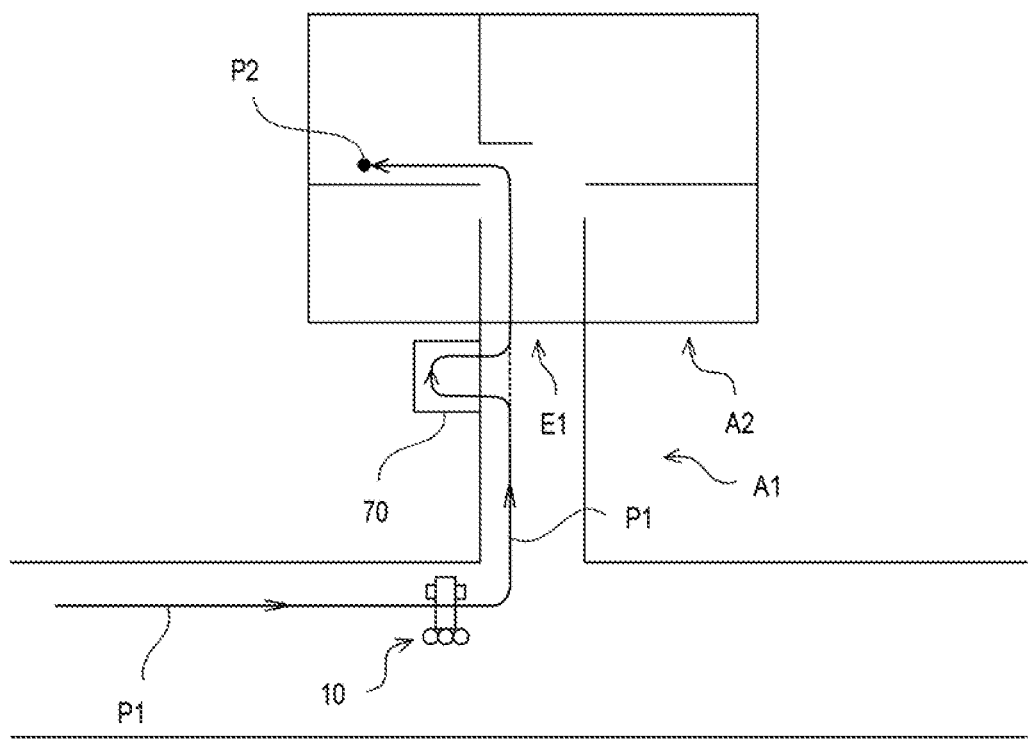
FIG. 8 is a diagram illustrating a delivery operation and a cleaning operation of the package transport robot shown in FIGS. 1A and 1B.

FIG. 8 is a diagram illustrating a delivery operation and a cleaning operation of the package transport robot 10 shown in FIGS. 1A and 1B. The package transport robot 10 travels from a first area A1 to a second area A2 along a travel route P1. It is assumed that the user's home is designated as the second area. The first area A1 is an area other than the second area A2. A dirt removing mat 70 is arranged near an entrance E1 to the user's home in the first area A1. As the dirt removing mat 70, a well-known mat such as a mat provided with a brush and a water absorbing member can be used.

The sensor data processing unit 106 performs image recognition of the captured image of the camera 50, acquires a relative position of the dirt removing mat 70 with respect to the package transport robot 10 based on the recognition result, and supplies information on the acquired relative position to the travel control unit 120. In this case, color, pattern, and the like of the dirt removing mat 70 may be appropriately determined so that the dirt removing mat 70 can be easily specified by image recognition.

The travel control unit 120 causes the package transport robot 10 to travel on the dirt removing mat 70 away from the travel route P1 based on the supplied location information of the dirt removing mat 70. The travel control unit 120 may cause the package transport robot 10 to reciprocate on the dirt removing mat 70.

Alternatively, the user may input the location information of the dirt removing mat 70 to the terminal device 62 in advance. In this case, the location information of the dirt removing mat 70 is included in the information on the P/D destination held in the server device 60, and the communication unit 52 acquires the location information of the device from the server device 60, and supplies the acquired information to the travel control unit 120. In this case, the travel control unit 120 may derive a travel route that passes through the dirt removing mat 70.

The travel control unit 120 causes the package transport robot 10 to travel on the dirt removing mat 70, return to the travel route P1, and pause before the entrance E1. The location information of the entrance E1 may be stored in the server device 60 in advance in association with the information on the P/D destination, or may be specified by image recognition in the sensor data processing unit 106. The information processing unit 126 notifies the user's terminal device 62 of the arrival via the communication unit 52. The user or the assistant of the user, who has confirmed the arrival notification at the terminal device 62, opens the door of the entrance E1. In the case of an automatic door, the user does not have to go to the entrance. In a case where it is specified by image recognition that the door of the entrance E1 has been opened, the travel control unit 120 causes the package transport robot 10 to enter the building in the second area A2 and move to a P/D location P2.

As described above, when traveling on the road in the first area A1, the package transport robot 10 performs the cleaning operation of the wheels 20 by traveling on the dirt removing mat 70, and then enters the building in the second area A2. Thereby, the second area A2 is hardly contaminated.

When the package transport robot 10 reaches the P/D location P2, the travel control unit 120 stops driving the motor. The user has obtained a passcode for unlocking the package addressed to the user from the server device 60 in advance. When the user transmits the passcode to the package transport robot 10 using the terminal device 62, the communication unit 52 receives the passcode for unlocking, and the information processing unit 126 unlocks the package. At this time, the motion control unit 122 drives the upright actuator 30 to cause the package transport robot 10 to transition to an upright posture. Consequently, the user recognizes that the package can be received, and can easily receive the package positioned on the main body unit 14 addressed to himself/herself. When the package is received by the user, the travel control unit 120 autonomously travels to the next destination.

The cleaning operation of the wheels 20 may be an operation in which the traveling mechanism 12 causes the wheels 20 to run idle on the dirt removing mat 70 under the control of the travel control unit 120. In this case, a middle wheel motor (not shown) for rotating a wheel shaft is provided on each of the pair of middle wheels 20b. The pair of middle wheels 20b can be independently rotated by each motor. The travel control unit 120 controls each motor to fix some of the wheels 20 and rotate the remaining wheels 20. The travel control unit 120 repeats this control while changing the wheels 20 to be fixed until all the wheels 20 run idle. Thereby, the dirt on the wheels 20 can be rubbed against the dirt removing mat 70, and the dirt on the wheels 20 can be removed more than when only traveling on the dirt removing mat 70. If the wheels 20 run idle such that the package transport robot 10 hardly moves, the area of the dirt removing mat 70 can be reduced.

The travel control unit 120 may rotate some wheels 20 in one direction and rotate the other wheels 20 in the opposite direction. In this case, all the wheels 20 can be caused to run idle at the same time, and dirt can be removed in a shorter time.

In a case where the location information of the dirt removing mat 70 cannot be acquired because, for example, the dirt removing mat 70 is not prepared, the traveling mechanism 12 causes the wheels 20 run idle on the road surface of the first area A1 under the control of the travel control unit 120. In particular, the traveling mechanism 12 causes the wheels 20 to run idle at a point which is a predetermined distance to the second area A2 on the travel route P1 of the first area A1. The predetermined distance may be set in advance by the user. As the wheels 20 run idle on the road surface, dirt on the wheels 20 can be rubbed against the road surface, and dirt can be removed.

In addition, the dirt removing mat 70 does not have to be used in the P/D service, and the cleaning operation of the wheels 20 may be an operation in which the traveling mechanism 12 causes idles the wheels 20 to run idle on the road surface of the first area A1. In this case, the cost of the dirt removing mat 70 can be reduced. Since the user does not have to install the dirt removing mat 70, the burden is reduced and the P/D service can be easily used.

In a case where the P/D destination is a building with a wet or dirty floor, such as a fish shop or a factory, the second area may be set to a road outside the building adjacent to the entrance of the building that is the P/D destination. That is, the first area is set to the building at the P/D destination. In this case, even if the wheels 20 become wet or dirty when traveling in the building such as a fish shop, the package transport robot 10 performs the cleaning operation and then travels outside the second area. Therefore, the road near to the entrance of the building is hardly contaminated.

Second Embodiment

For example, in a case of a house or company that one can enter on foot, if the wheels 20 are relatively clean, it is considered that the user does not care even if the package transport robot 10 enters the building without cleaning the wheels 20. If the wheels 20 are not cleaned, the P/D is completed in a shorter time, and it is advantageous for both the user and the provider of the P/D service. Therefore, in the second embodiment, the control unit 100 causes the traveling mechanism 12 to perform the cleaning operation of the wheels 20 when a predetermined cleaning condition is satisfied, and not to perform the cleaning operation when the cleaning condition is not satisfied. Hereinafter, the description will be made focusing on the differences with the first embodiment.

First Cleaning Condition

A first cleaning condition is that a user inputs a cleaning instruction. The information processing unit 126 notifies the user's terminal device 62 of the information on the travel route via the communication unit 52. For example, the information on the travel route includes at least one of a map image indicating the travel route and an image of the road surface of the travel route, which are captured by the camera 50 during traveling. The image of the road surface of the travel route is a moving image or a still image. A notification timing for the map image may be when the package transport robot 10 starts moving to the P/D destination or when the package transport robot 10 is paused in front of the entrance to the P/D destination. A notification timing for the image of the road surface image of the travel route may be when the package transport robot 10 is paused in front of the entrance to the P/D destination. While the package transport robot 10 is paused in front of the entrance, the display 48 may display the image of the road surface of the travel route. The terminal device 62 or the display 48 may also display information for confirming the input of the cleaning instruction, such as the text "would you like to clean the wheels?" The user decides whether or not to input the cleaning instruction based on these pieces of information.

For example, in a case where the travel route is an outdoor road after raining or snowing, it is assumed that the user inputs the cleaning instruction. In a case where the travel route is a clean passage in an apartment or an underground mall, it is assumed that the user does not input the cleaning instruction. If the user is concerned about dirt on the travel route, the user can input the cleaning instruction and the cleaning operation can be performed, even if the wheels 20 are visually recognized as not being very dirty.

The acceptance unit 102 accepts the input of the cleaning instruction by the user, and supplies the received cleaning instruction to the travel control unit 120. The acceptance unit 102 detects the input of the cleaning instruction by the user using the display 48 configured as a touchscreen or a microphone (not shown), for example. The user inputs the cleaning instruction to the package transport robot 10 that is paused in front of the entrance. Alternatively, the user may input the cleaning instruction to the terminal device 62, and the terminal device 62 may transmit the cleaning instruction to the package transport robot 10. In this case, the communication unit 52 receives the transmitted cleaning instruction and supplies the received cleaning instruction to the travel control unit 120.

The travel control unit 120 performs, in a case where the cleaning instruction is received, the cleaning operation of the wheels 20 on the traveling mechanism 12 before allowing the package transport robot 10 to enter the second area. If the cleaning instruction is not received even after a predetermined time has elapsed since the vehicle was paused in front of the entrance of the building which is the P/D destination, the travel control unit 120 allows the package transport robot 10 to enter the second area without causing the traveling mechanism 12 to perform the cleaning operation of the wheels 20. Consequently, it is possible to prevent the cleaning operation from being performed when the user determines that the cleaning operation is unnecessary.

Second Cleaning Condition

The second cleaning condition may be used instead of the first cleaning condition. The second cleaning condition is that dirt on the wheels 20 has been detected from the image of the wheels 20.

The camera 50 is provided at a location where the plurality of wheels 20 can be captured. Before entering the second area, the sensor data processing unit 106 acquires images of the wheels 20 from the camera 50, recognizes the acquired images, and detects dirt on the wheels 20. The sensor data processing unit 106 functions as a detection unit. The dirt on the wheels 20 may be, for example, mud, animal feces, dust, and the like.

The travel control unit 120 causes, in a case where the dirt on the wheels 20 is detected, the traveling mechanism 12 to perform the cleaning operation of the wheels 20. The travel control unit 120 causes, in a case where the dirt on the wheels 20 is not detected, the traveling mechanism 12 not to perform the cleaning operation of the wheels 20.

Accordingly, in a case where the wheels 20 are likely to get dirty, the cleaning operation of the wheels 20 can be performed, and an unnecessary cleaning operation can be avoided.

Third Cleaning Condition

The third cleaning condition may be used instead of the first cleaning condition. The third cleaning condition is that dirt on the traveling path has been detected from the image of the traveling path.

The camera 50 is provided at a location where the traveling path can be captured. Before entering the second area, the sensor data processing unit 106 acquires images of the traveling path in the first area from the camera 50, recognizes the acquired images, and detects dirt on the traveling path. The dirt on the traveling path may be, for example, mud, animal feces, dust, and the like.

The travel control unit 120 causes, in a case where the dirt on the traveling path is detected, the traveling mechanism 12 to perform the cleaning operation of the wheels 20. The travel control unit 120 causes, in a case where the dirt on the traveling path is not detected, the traveling mechanism 12 not to perform the cleaning operation of the wheels 20.

In this case, when the wheels 20 are likely to get dirty, the cleaning operation of the wheels 20 can be performed, and an unnecessary cleaning operation can be avoided.

At least two of the first, second, and third cleaning conditions may be used together, and the cleaning operation may be performed in a case where any of the used conditions is satisfied.

Third Embodiment

The third embodiment is different from the first embodiment in that the wheels 20 that touch the road surface upon entering the second area are replaced. Hereinafter, the description will be made focusing on the differences from the first embodiment.

Figure 9A:
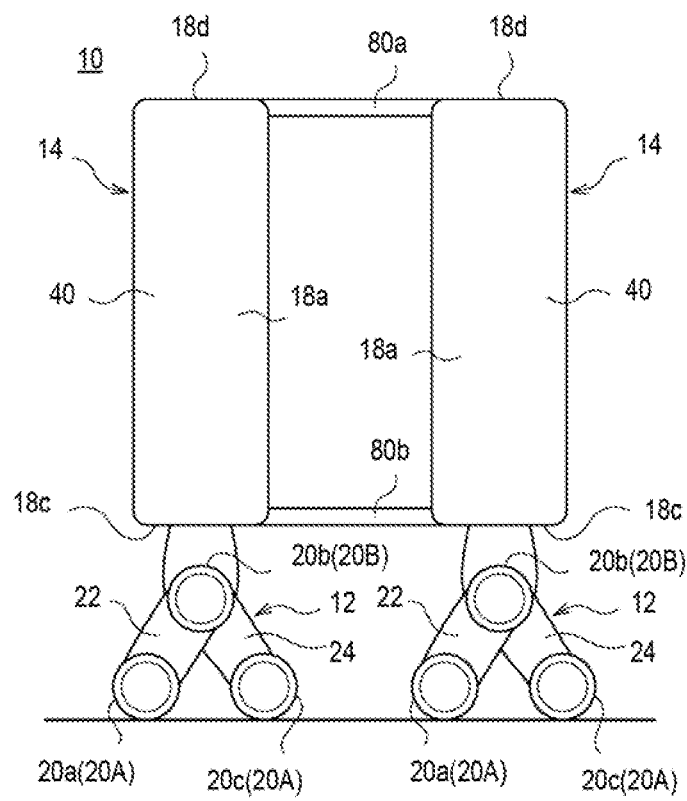
FIG. 9A is a side view of a package transport robot according to a third embodiment.
Figure 9B:
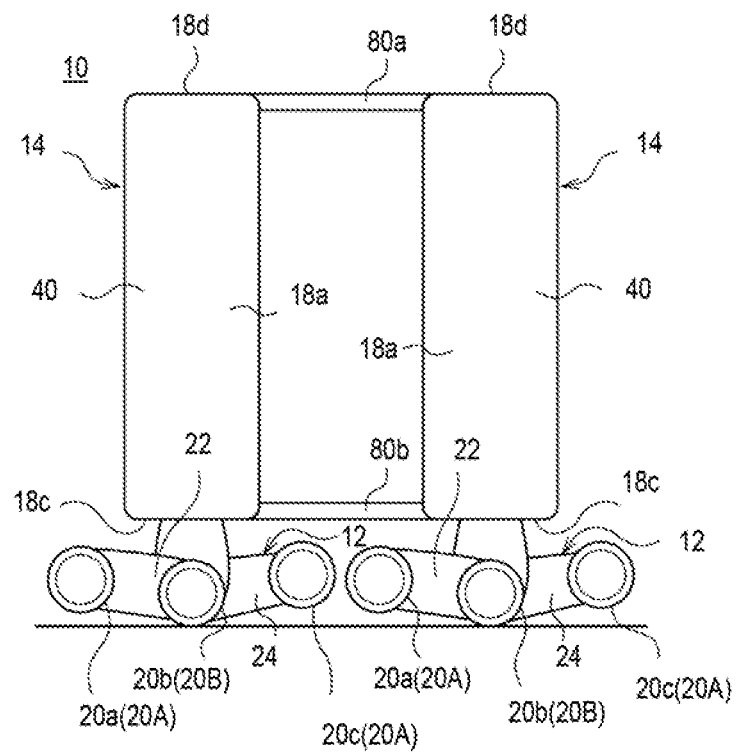
FIG. 9B is a side view of the package transport robot according to the third embodiment.

FIGS. 9A and 9B are respective side views of a package transport robot 10 according to a third embodiment. The package transport robot 10 includes two package transport robots 10 of FIGS. 1A and 1B and the pair of connecting members 80a and 80b. One connecting member 80a connects the top plate 18d of one frame body 40 and the top plate 18d of the other frame body 40, and the other connecting member 80b connects the bottom plate 18c of the one frame body 40 and the bottom plate 18c of the other frame body 40. One control unit 100 controls the entire package transport robot 10. The middle wheel motor (not shown) for rotating the wheel shaft is provided on each of the pair of middle wheels 20b. Since one package can be held by the two frame bodies 40, a long object can be stably held.

Hereinafter, the four front wheels 20a and the four rear wheels 20c are referred to as a plurality of first wheels 20A. The four middle wheels 20b are referred to as a plurality of second wheels 20B.

In the first area, the motion control unit 122 drives the upright actuator 30 to control each of the two traveling mechanisms 12 to transition an upright posture as shown in FIG. 9A. In other words, the motion control unit 122 causes the traveling mechanism 12 to move the plurality of second wheels 20B so as to be apart from the road surface and bring the plurality of first wheels 20A into contact with the road surface, thereby causing the package transport robot 10 to travel by the eight first wheels 20A. The travel control unit 120 does not drive the middle wheel motor and does not rotate the middle wheels 20b. Since the plurality of second wheels 20B do not touch the road surface, the second wheels 20B can be kept clean during traveling in the first area.

The cleaning operation of the wheels 20 is an operation in which the traveling mechanism 12 moves the plurality of first wheels 20A so as to be apart from the road surface and brings the plurality of second wheels 20B into contact with the road surface under the control of the motion control unit 122 as shown in FIG. 9B. That is, the motion control unit 122 controls each of the two traveling mechanisms 12 to have a substantially V-shaped posture, and causes the package transport robot 10 to travel by the four second wheels 20B. The first wheel body 22 and the second wheel body 24 are inclined with respect to the contact surface in directions opposite to those in an upright posture, and the traveling mechanism 12 can transition to a substantially V-shaped posture. Consequently, the second wheels 20B that are not contaminated can travel in the second area. The travel control unit 120 drives the middle wheel motor to rotate the middle wheels 20b, but does not drive the front wheel motor 36 and the rear wheel motor 38 to rotate the front wheels 20a and the rear wheels 20c.

The number of wheels 20 is not limited to the examples in FIGS. 9A and 9B as long as the first area can be driven to by the first wheels 20A and the second area can be driven to by the second wheels 20B. For example, the configuration of the traveling mechanism 12 may be modified by providing four first wheels 20A and four second wheels 20B. Further, the number of the frame bodies 40 may be one.

Fourth Embodiment

The fourth embodiment is different from the first embodiment in that the package is passed from the package transport robot 10 in the first area to another package transport robot 10 in the second area without performing the cleaning operation of the wheels 20. Hereinafter, the description will be made focusing on the differences with the first embodiment.

The package transport robot 10 for delivering the package does not enter the second area and stops in front of the entrance to the delivery destination. The information processing unit 126 transmits, via the communication unit 52, a package delivery instruction to another package transport robot 10 located in the building which is the delivery destination. Another package transport robot 10 that has received the package delivery instruction travels in the building which is the delivery destination and moves to the entrance. Since another package transport robot 10 does not enter the first area and travels only in the building which is the delivery destination, the wheels 20 are less likely to get dirty.

Figure 10:
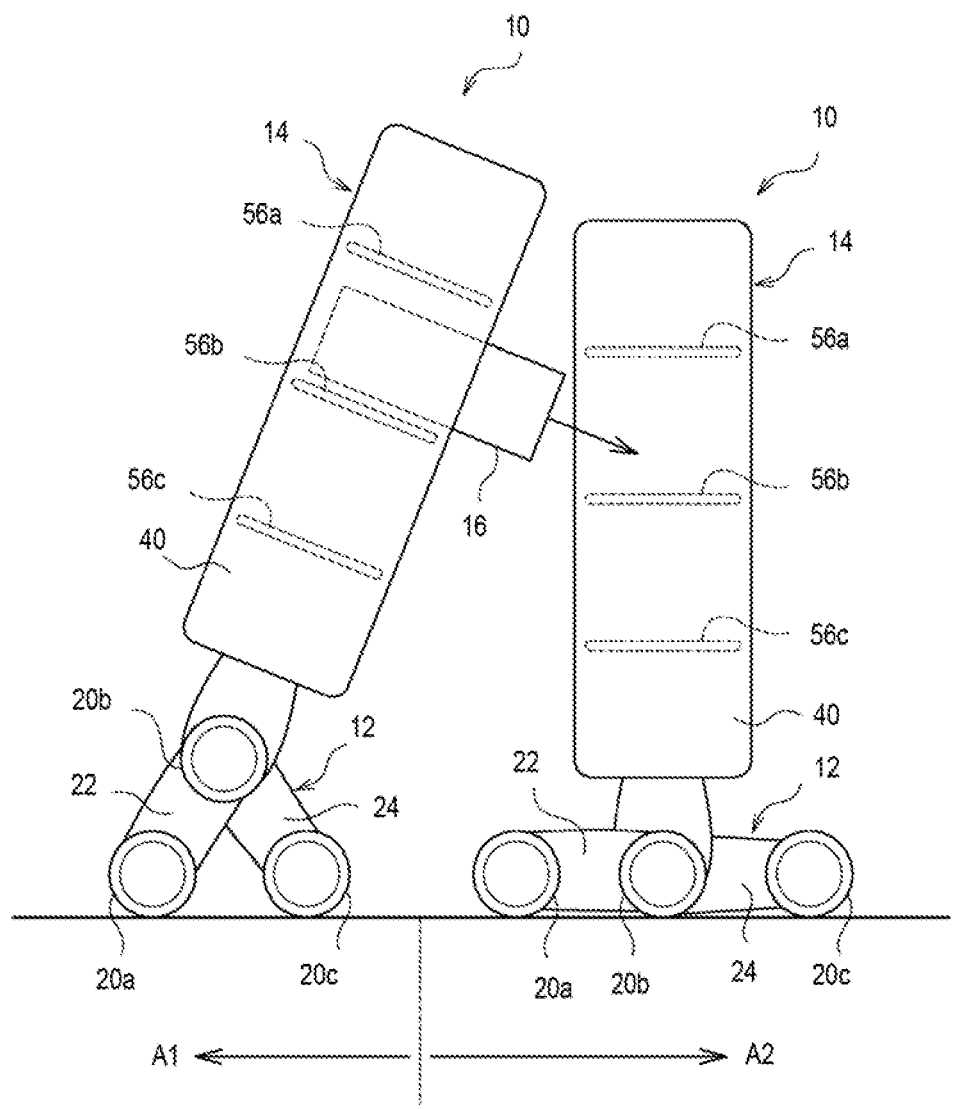
FIG. 10 is a diagram illustrating package delivery by two package transport robots according to a fourth embodiment.

FIG. 10 is a diagram illustrating delivery of the package 16 by two package transport robots 10 according to the fourth embodiment. Another package transport robot 10 in the second area A2 approaches, based on the image captured by the camera 50 and the detection result of the object detection sensor 34, the package transport robot 10 in the first area A1 to a predetermined distance which is enough to receive a package 16. The package transport robot 10 and another package transport robot 10 are arranged with the opening of the frame bodies 40 facing each other.

The package transport robot 10 in the first area A1 delivers the package to another package transport robot 10 in the second area A2. In a case where the package 16 is moved to another package transport robot 10, the motion control unit 122 of the package transport robot 10 drives the upright actuator 30 to control the traveling mechanism 12 to take an upright posture, and drives the tilt actuator 46 to tilt the frame body 40 toward a side of another package transport robot 10. The information processing unit 126 releases the lock of the package 16. Consequently, the package 16 slides on the inclined second ridge 56b.

The motion control unit 122 of another package transport robot 10 maintains the traveling mechanism 12 in the horizontal posture and maintains the frame body 40 in an upright state.

In this way, the package transport robot 10 slides the package 16 from a position higher than the second ridge 56b of another package transport robot 10, and moves the package 16 onto the second ridge 56b of another package transport robot 10.

The motion control unit 122 of another package transport robot 10 may tilt the frame body 40 of another package transport robot 10 in an inclined direction of the frame body 40 of the package transport robot 10. An inclination angle of the frame body 40 of another package transport robot 10 is smaller than that of the frame body 40 of the package transport robot 10. Accordingly, another package transport robot 10 can easily receive the package.

A transfer roller (not shown) may be arranged on the ridge 56 of the package transport robot 10, and the package 16 may be moved out by rotating the transfer roller by a motor while the frame body 40 is inclined. A transfer roller may also be provided on the ridge 56 of another package transport robot 10 to receive the package 16 by rotating the transfer roller. Accordingly, the package 16 can be moved more easily.

Alternatively, the package transport robot 10 may include a manipulator (not shown) that pushes the package 16 toward another package transport robot 10 with the frame body 40 inclined. The manipulator may be provided on the frame body 40. Further, two manipulators may be provided, the frame body 40 may not be inclined, the two manipulators may hold the package 16 therebetween, and the held package 16 may be moved into the frame body 40 of another package transport robot 10.

When the package 16 moves into the frame body 40 of another package transport robot 10, the information processing unit 126 of the other package transport robot 10 locks the package 16 and the travel control unit 120 allows another package transport robot 10 to travel toward a predetermined delivery position.

When the wheels 20 are highly contaminated due to animal feces or the like, even if the dirt on the wheel 20 is removed by the cleaning operation of the first embodiment, or alternatively, the wheels 20 are replaced by the cleaning operation of the third embodiment, the user may feel uncomfortable when the package transport robot 10 travels in the building. In the present embodiment, the package transport robot 10 that has traveled in the first area A1 does not enter the second area A2, so that the building can be more reliably prevented from being contaminated, and thus the user does not feel uncomfortable.

The package delivery has been described, but pickup can be performed in the same manner. In this case, the package 16 is loaded on another package transport robot 10 by the user in the second area A2, and another package transport robot 10 approaches the package transport robot 10 in the first area A1 when receiving a package transfer instruction. The operation for moving the package between the package transport robot 10 and another package transport robot 10 is performed in reverse to the way stated above.

The present disclosure has been described based on the embodiments. It will be apparent to those skilled in the art that the embodiments are merely examples, various modifications can be made to combinations of the components and processings, and such modifications also fall within the scope of the present disclosure.

For example, the second embodiment may be combined with the third or fourth embodiment.

The transport robot of one aspect of the present disclosure can also be implemented as follows.

[Item 1]

A transport robot for picking up or delivering an object includes a traveling mechanism having a traveling function, and a main body unit supported by the traveling mechanism and on which the object is placed. The transport robot receives or delivers the object in a first area to another transfer robot in a second area.

[Item 2]

In the transport robot of item 1, the main body unit has a frame forming a storage space that stores the object therein. The transport robot further includes a control unit configured to, in a case where the package is moved to another transport robot, control the traveling mechanism to transition an upright posture, thereby tilting the frame toward a side of another transport robot.

What is claimed is:

1. A vehicle configured to travel from a first area to a second area, the vehicle comprising:
a traveling mechanism having a plurality of wheels and a traveling function; and
a controller configured to cause the traveling mechanism to perform a wheel cleaning operation and then cause the vehicle to enter the second area, wherein the wheel cleaning operation is an operation in which one of the wheels is rotated, the other of the wheels is fixed, and the traveling mechanism causes the wheels to run idle on the first area.

2. The vehicle according to claim 1, wherein the controller is configured to, in a case where a predetermined cleaning condition is satisfied, cause the traveling mechanism to perform the wheel cleaning operation and then cause the vehicle to enter the second area.

3. The vehicle according to claim 2, wherein the controller is configured, in a case where the predetermined cleaning condition is not satisfied, to cause the vehicle to enter the second area without causing the traveling mechanism to perform the wheel cleaning operation.

4. The vehicle according to claim 2, further comprising:
a detector configured to detect dirt on the wheels or a traveling path based on an image of the wheels or the traveling path captured by a camera,
wherein the cleaning condition is that the detector detects dirt on the wheels or the traveling path.

5. The vehicle according to claim 1, wherein the second area is designated by a user.

6. The vehicle according to claim 1, wherein the wheel cleaning operation is an operation in which the one of the wheels is rotated, the other of the wheels is fixed, and the traveling mechanism causes the wheels to run idle on the first area after the one of the wheels was fixed and the other of the wheels was rotated.

* * * * *